United States Patent [19]
Colignon

[11] 3,799,056
[45] Mar. 26, 1974

[54] THERMAL INSULATION BLOCKS, PARTICULARLY FOR SPACE VEHICLES

[75] Inventor: Pierre Colignon, Courbevoie, France

[73] Assignee: Bronzavia, Courbevoie, France

[22] Filed: Sept. 18, 1972

[21] Appl. No.: 289,639

[30] Foreign Application Priority Data
Dec. 29, 1971  France .............................. 71.47296

[52] U.S. Cl. ............. 102/105, 60/200 A, 244/1 SC, 244/117 A
[51] Int. Cl. ...................... F42b 11/00, F42b 13/00
[58] Field of Search ........... 102/105, 493; 244/1 SC, 244/117 A; 60/200 A; 161/196, DIG. 4

[56] References Cited
UNITED STATES PATENTS

| | | | |
|---|---|---|---|
| 3,122,883 | 3/1964 | Terner | 244/117 A X |
| 3,439,885 | 4/1969 | Sackleh | 102/105 X |
| 3,064,317 | 11/1962 | Dobson | 244/117 A X |
| 3,490,718 | 1/1970 | Vary | 249/1 SC |
| 3,152,548 | 10/1964 | Schwartz | 102/105 |
| 3,463,150 | 8/1969 | Penfold | 244/1 SC X |
| 3,321,154 | 5/1967 | Downs | 244/1 SC X |

Primary Examiner—Benjamin A. Borchelt
Assistant Examiner—H. J. Tudor
Attorney, Agent, or Firm—A. W. Breiner

[57] ABSTRACT

A thermal insulation block for use in particular between a heat shield and the body of a space vehicle comprises an envelope of which the wall adjacent the body is of insulating material. A number of spaced parallel screens are contained within the envelope and serve to reflect infra-red radiation. The spaces between the screens and between the walls of the envelope and the screens are filled with a refractory fibrous material.

10 Claims, 3 Drawing Figures

PATENTED MAR 26 1974
3,799,056
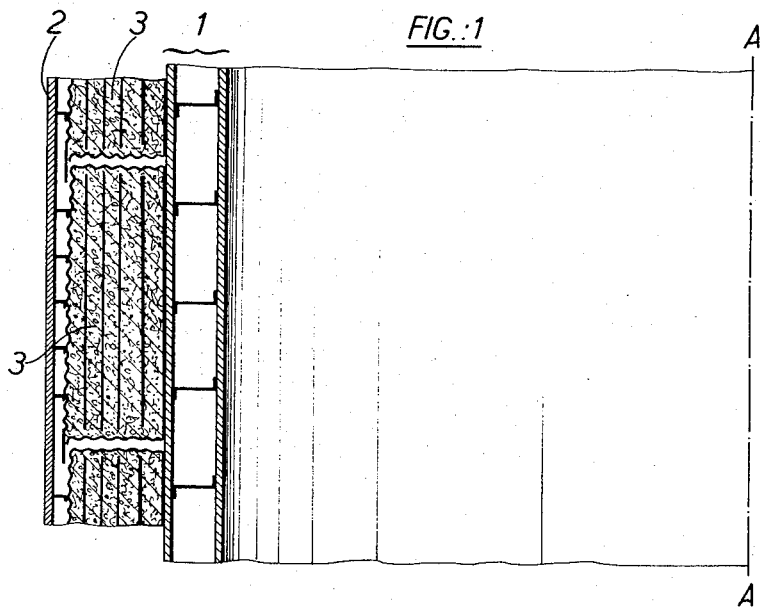
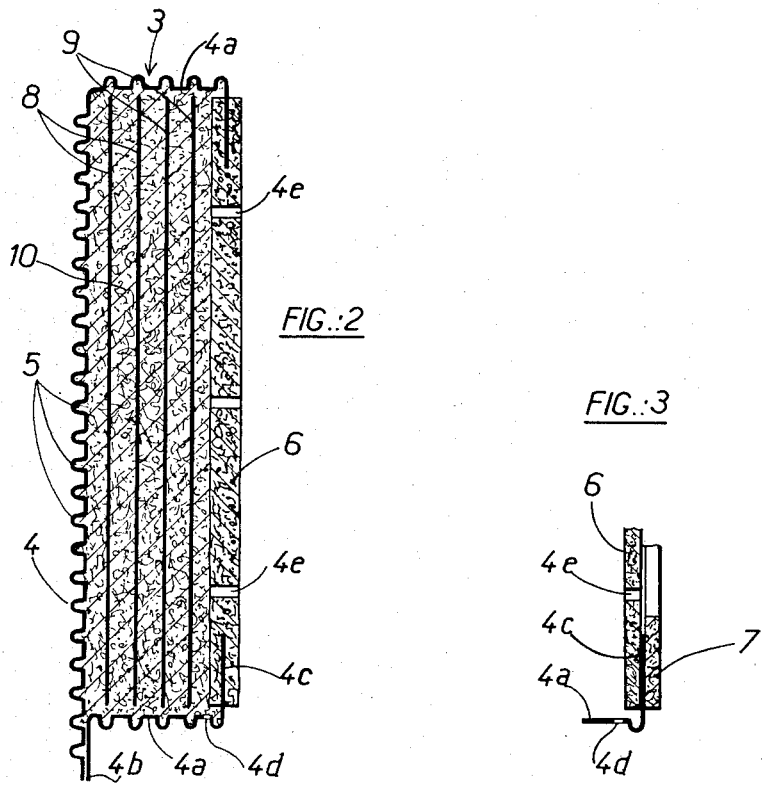

THERMAL INSULATION BLOCKS, PARTICULARLY FOR SPACE VEHICLES

BACKGROUND OF THE INVENTION

This invention relates to thermal insulation blocks, and is concerned with insulation material for space vehicles and for high speed aircraft.

In practice, insulation material for aircraft engines is normally enclosed within a thin metallic envelope which is provided with vent-holes to allow for variations in pressure. Damp which penetrates the envelope while the aircraft is standing on the ground is dispersed by heat once the engines are started up. As for the aircraft fuselage's insulation, this is placed inside the pressurised skin of the fuselage; it can therefore be contained within a flexible air-tight envelope.

In a space vehicle, more especially one which may undergo several re-entries into the earth's atmosphere, the above techniques no longer apply. In fact, the thermal insluation material has to protect the structure of the vehicle against kinetic heating and it must therefore be placed outside the skin. An air-tight envelope cannot, therefore, be used since sudden variations in pressure must be equalised within the insulation, and heating can no longer be relied on to eliminate damp which penetrates the insulating materials while the vehicle is resting on the ground and which adds to the weight of the vehicle at the moment of take-off.

It must also be noted that humidity will also be absorbed whenever the surrounding air is warmer than the body of the apparatus and that condensation inside the insulation may then occur. To this must be added the need to minimise the weight of the insulation and to ensure that its external surface is capable of resisting temperature up to 1,200° C. The above considerations are equally valid for high-velocity moving bodies apart from space vehicles, especially for aircraft or rockets which are to fly at a high Mach number. This invention is aimed at a thermal insulating material whose constituent parts are adapted and mutually integrated so as to satisfy these various desiderata.

SUMMARY OF THE INVENTION

Thermal insulation blocks are placed in the space between the surface of the craft and protective refractory shield. The blocks, which are independent from one another, can be placed alongside each other within the said space so as to constitute by their juxtaposition as continuous as insulating layer as possible, taking into account the mechanical joints required between the surface of the craft and the protective shield.

Each of these blocks comprises an envelope of which the wall exposed directly to the heat emission consists of a refractory material, preferably a refractory metal but sufficiently thin to have a low thermal conductivity, whilst the opposite wall of the said envelope consists at least in part of an insulating material, the said envelope containing screen which reflect infra-red rays and are disposed in parallel between the said walls and are separated by a filling of refractory insulating fibres, the screens being of such constitution and number as to produce enough difference in temperature between the two walls to prevent overheating of the insulating wall.

BRIEF DESCRIPTION OF THE DRAWINGS

FIG. 1 shows schematically in vertical section a method of applying thermal insulating material in accordance with the invention to a space vehicle, FIG. 2 shows on a larger scale a section through a block of the insulating material shown in FIG. 1, and FIG. 3 is a partial view of an alternative form of block.

DESCRIPTION OF THE PREFERRED EMBODIMENTS

In FIG. 1 is represented very schematically and only as an example, in order to make the principle of the invention understood, a section through part of a space vehicle supposedly rotating about an axis A—A.

1 is the wall of the body of the engine and 2 an external wall of refractory metal which constitutes the thermal shield which has to withstand the kinetic heating during the very high-speed trajectory of the space vehicle through the atmosphere. This shield 2 can be made in various ways which are known and which do not form part of the invention. It is joined to the wall 1 by supports which are not shown in the drawing since they can be of any kind, being arranged according to known techniques so that the amount of heat transmitted from the shield 2 to the wall 1 by conduction through these supports is reduced to the minimum. The shield 2 is not air-tight, so that the pressure in the space between it and the wall 1 will remain in balance with the outside pressure.

External humidity can therefore penetrate between the shield 2 and the wall 1 but generally the orifices provided in the shield 2 will be arranged in such a way that when the vehicle is installed on its launcher, axis A—A being then vertical, water will flow on to the shield without passing through it. The elements of the shield can thus be overlapped like the tiles on a roof.

The invention aims to reduce as far as possible the transmission of heat from the shield 5 of the wall 1 by radiation and convection. A number of insulating blocks 3, the details of which are shown in FIG. 2, are arranged as closely as possible to each other in the spaces between the shield 2 and the wall 1 left free by the mechanical joints between these two elements. Each of these blocks 3 comprises an envelope having a general parallelepipedal shape and forming a closed box except for the provision of orifices as discussed later.

The outer wall 4 of this box, i.e., that which is nearest to the shield and thus to the source of heat, as well as the lateral walls 4a of the box, are formed from a refractory sheet, for example of a nickel-chromium steel, which has a thickness of only about 0.05 mm so as to have as low a thermal conductivity as possible. This sheet is corrugated or provided with ribs 5 to add to its rigidity and to prevent deformation thereof by heat. Preferably, wall 4 has on one or more sides thereof a projecting edge such as that indicated at 4b so that, in the block assembly, by overlapping the block underneath, as shown in FIG. 1, this edge allows moisture to flow from one block to the other without penetrating into the spaces between the blocks.

Wall 6 of the box, which is nearest to the wall 1 of the vehicle and thus farthest from the heat source, consists of a plate of some thickness of a rigid insulating material, preferably a cellular plastics material having some resistance to heat, for example a foamed polyimide. The metal walls 4a are joined to this insulating plate by folded edges 4c penetrating into the thickness of said plate so as to prevent any direct contact between the metal of the walls 4a and the wall 1 of the vehicle on which the block is mounted. Plate 6 can also consist of two layers which are stuck together and between which the edges 4c are locked. Alternatively, as FIG. 3 shows, the edges 4c can be placed under a plate 6 of single thickness, being subsequently surrounded by a frame 7 of the same insulating material fastened to the plate 6.

The blocks, or more exactly their walls 4 and 6, can have a variety of shapes and dimensions according to the configurations and sizes of the spaces left free between the shield 2 and the wall 1 of the vehicle by the mechanical joints between these two elements, in order that these spaces may be best filled by the blocks.

Inside the box thus formed are arranged a certain number of screens 8, 9 which are parallel to one another and to the walls 4 and 6. The screens are positioned so as to reflect as effectively as possible the infra-red rays coming from the heat source, i.e., from the shield 2. The space within the box, both between the wall 4 and the first of the screens 8 as well as between the successive screens and between the last of the screens 9 and the wall 6, is filled with a light filling 10 of insulating and refractory mineral fibres (such as fibres of silica (quartz), alumina or zirconia). As this filling is light, weighing about 12 kg/m$^3$, it can be permeated by infra-red radiations without substantial increase in the temperature thereof.

Radiations coming from the shield are already partly reflected by the wall 4 of refractory metal, which may for that purpose have a polished surface. Radiations which reach the first screen 8 are mostly reflected, so that this screen 8 will tend to have a lower temperature than the wall 4. Radiations of lower intensity which reach the second screen 8 are again mainly reflected and so on for the following screens, so that a negative temperature gradient is established between the wall 4 and the wall 6. With a temperature at the shield 2 of the order of 1,200° C, it is thus possible, with a suitable number of screens separated by about one centimetre, to reduce the temperature as one moves from the screen to the vehicle to a level which can be borne by the plate 6, for example to a level of the order of 300° to 400° C suitable for the foamed plastics material selected to form the plate 6.

The screens 8 which are closest to the wall 4, which is itself close to the heat source, each consist of a thin support, preferably of sliced mica sheet, having for example a thickness of about 0.02 mm, plated with gold having a thickness, for example of 0.5 to 1 micron. By using a number of such screens the temperature can be reduced by the screens 8 to 600° C or lower for a shield temperature of about 1,200° C. The following screen or screens 9 nearer to plate 6 can then consists of sheets of polished aluminum having, for example, a thickness of 0.02 mm. Although only two screens 8 and two screens 9 are shown in the drawings, the number of screens will vary according to the temperature drop it is necessary to achieve. The heat transmitted to the plate 6 by conduction across the side walls 4a of the envelope can be relatively slight by reason of the very small section of these walls.

It should be noted that the screens 8 and 9 also serve to stop air moving in a direction perpendicular to their surface and thus to prevent condensation of humidity which may find its way into the block. The envelope is pierced with holes so as to allow equalisation of the pressures outside and inside the blocks. Preferably, these holes are arranged in such a way as to prevent, as far as possible, direct entry of water which may flow on to the outside surface of the blocks. For example, holes 4d may be provided in the bottom of the side walls 4a of the envelope or holes 4e may extend through the plate 6.

I claim:

1. A thermal insulation block for protecting the outer surface of a high-velocity body of the spacecraft type, said block comprising an envelope which includes a wall of insulating material constructed to be placed against said outer surface of said high-velocity body, a plurality of screens which reflect infra-red radiation positioned within the envelope parallel to said wall and refractory insulating fibres filling the spaces between the screens and between the envelope and the screens.

2. A thermal insulation block according to claim 1, wherein the walls of the envelope, except for the wall of insulating material, consist of a sheet of refractory metal having a thickness of the order of 0.05 mm, this sheet being ribbed in order to increase its mechanical rigidity.

3. A thermal insulation block according to claim 2, wherein at the junction zone of the metal sheet and the wall of insulating material the said sheet is inserted between two thicknesses of the insulating material.

4. A thermal insulation block according to claim 1, wherein the envelope is pierced with holes so as to allow equalisation of the pressures between the outside and the inside of the envelope.

5. A thermal insulation block according to claim 1, wherein the envelope has a projecting edge along at least one side of the block arranged to overlap a neighbouring block when a number of blocks are placed side by side.

6. A thermal insulation block according to claim 1, wherein at least the reflecting screen farthest from the wall of insulating material consists of a refractory support which has been given a coating of a precious metal, such as gold.

7. A thermal insulation block according to claim 6, wherein the refractory support is a sheet of mica.

8. A thermal insulation block according to claim 1, wherein at least the screen nearest to the wall of insulating material consists of a sheet of polished aluminum.

9. A thermal insulation block according to claim 1, wherein the fibres forming the filling between the screens are selected from the group consisting of silica (quartz), alumina and zirconia fibres, the filling having a low density of the order of 12 kg/m$^3$, and being easily permeable by infra-red rays.

10. A body capable of travelling at very high velocities, said body having a heat shield spaced from its surface and connected thereto with the space between the shield and said surface containing at least one thermal insulation block, said block comprising an envelope which includes a wall of foamed synthetic plastics material positioned in engagement with said surface, a plurality of screens which reflect infrared radiation disposed within the envelope parallel to said wall and refractory insulating fibres filling the spaces between the screens and between the envelope and the screens.

* * * * *